US012778316B2

(12) United States Patent
Yang

(10) Patent No.: US 12,778,316 B2
(45) Date of Patent: Nov. 3, 2026

(54) HIGH-STABILITY PLAYARD ENCLOSING ROD ASSEMBLY AND PLAYARD

(71) Applicant: XIAMEN BABY PRETTY PRODUCTS CO., LTD., Xiamen (CN)

(72) Inventor: Jianbo Yang, Xiamen (CN)

(73) Assignee: XIAMEN BABY PRETTY PRODUCTS CO., LTD., Xiamen (CN)

( * ) Notice: Subject to any disclaimer, the term of this patent is extended or adjusted under 35 U.S.C. 154(b) by 0 days.

(21) Appl. No.: 19/305,817

(22) Filed: Aug. 21, 2025

(65) Prior Publication Data

US 2026/0090658 A1 Apr. 2, 2026

(30) Foreign Application Priority Data

Sep. 27, 2024 (CN) ........................ 202422367471.8

(51) Int. Cl.

| | |
|---|---|
| ***A47D 13/06*** | (2006.01) |
| ***A47D 7/00*** | (2006.01) |
| ***F16C 11/00*** | (2006.01) |
| ***F16C 11/04*** | (2006.01) |
| *A47D 9/00* | (2006.01) |

(52) U.S. Cl.

CPC ......... *A47D 13/063* (2013.01); *A47D 13/061* (2013.01); *F16C 11/04* (2013.01); *A47D 7/002* (2013.01); *A47D 9/005* (2013.01); *F16C 11/00* (2013.01)

(58) Field of Classification Search

CPC .... A47D 13/063; A47D 13/061; A47D 13/06; A47D 7/00; A47D 7/002; A47D 7/01; A47D 9/00; A47D 9/005; A47D 9/012; F16C 11/04; F16C 11/00

USPC .......................................... 5/99.1, 98.1, 93.1

See application file for complete search history.

(56) References Cited

U.S. PATENT DOCUMENTS

| | | | | |
|---|---|---|---|---|
| 7,694,361 B1 * | 4/2010 | Chen | .................... | A47D 13/063 5/98.1 |
| 10,835,055 B2 * | 11/2020 | Mountz | ................ | A47D 13/063 |
| 10,980,356 B2 * | 4/2021 | Zhang | .................. | A47D 13/063 |

(Continued)

FOREIGN PATENT DOCUMENTS

| | | | | |
|---|---|---|---|---|
| CN | 114532797 A | * | 5/2022 | ............. A47D 7/002 |
| CN | 219374234 U | * | 7/2023 | ........... A47D 13/063 |

(Continued)

*Primary Examiner* — Robert G Santos

(74) *Attorney, Agent, or Firm* — Bayramoglu Law Offices LLC

(57) ABSTRACT

A high-stability playard enclosing rod assembly includes a hinge joint, two upper enclosing rods, two lower enclosing rods, a connecting base, and two first iron elements, where the connecting base is connected inside the hinge joint; the two first iron elements are respectively connected to front and rear portions of the connecting base; the first iron elements each are provided with two first guide grooves that are symmetrical on the left and right; top left and right ends of the first iron element respectively form extension portions; left and right end surfaces of the first iron element respectively form inclined surfaces; an arc-shaped groove is formed between a bottom of the extension portion and a top of the inclined surface; ends of the two upper enclosing rods are respectively connected to second iron elements; the second iron elements are located between the two first iron elements.

14 Claims, 3 Drawing Sheets

(56) References Cited

U.S. PATENT DOCUMENTS

| | | | | | |
|---|---|---|---|---|---|
| 11,369,211 | B2 * | 6/2022 | Mountz | | A47D 13/063 |
| 11,771,237 | B2 * | 10/2023 | Mountz | | A47D 13/061<br>5/99.1 |
| 12,035,820 | B1 * | 7/2024 | Zhang | | A47D 13/063 |
| 12,285,119 | B2 * | 4/2025 | Mountz | | A47D 13/061 |
| 12,369,727 | B2 * | 7/2025 | Huang | | A47D 7/002 |
| 12,426,721 | B2 * | 9/2025 | Li | | A47D 9/005 |
| D1,098,890 | S * | 10/2025 | Zhang | | D6/718.26 |
| 12,471,719 | B2 * | 11/2025 | Chen | | A47D 9/005 |
| 12,557,921 | B1 * | 2/2026 | Zhang | | A47D 9/005 |
| 2017/0280892 | A1 * | 10/2017 | Zhang | | A47D 13/063 |
| 2018/0332977 | A1 | 11/2018 | Sozzo | | |
| 2019/0142183 | A1 * | 5/2019 | Mountz | | A47D 13/061<br>5/99.1 |
| 2021/0007509 | A1 * | 1/2021 | Mountz | | A47D 13/061 |
| 2022/0279938 | A1 * | 9/2022 | Mountz | | A47D 13/063 |
| 2023/0404289 | A1 * | 12/2023 | Mountz | | A47D 13/061 |
| 2024/0180338 | A1 * | 6/2024 | Chen | | A47D 9/005 |
| 2024/0341498 | A1 * | 10/2024 | Huang | | A47C 19/122 |
| 2024/0423387 | A1 * | 12/2024 | Li | | A47D 9/005 |
| 2025/0235013 | A1 * | 7/2025 | Mountz | | A47D 13/063 |
| 2025/0351975 | A1 * | 11/2025 | Zhang | | A47D 13/063 |
| 2026/0090658 | A1 * | 4/2026 | Yang | | A47D 13/063 |
| 2026/0150982 | A1 * | 6/2026 | Yang | | A47D 13/063 |

FOREIGN PATENT DOCUMENTS

| | | | | | |
|---|---|---|---|---|---|
| CN | 219479669 | U | | 8/2023 | |
| CN | 219877834 | U | | 10/2023 | |
| CN | 114732249 | B | * | 4/2025 | A47D 13/063 |
| CN | 223183253 | U | * | 8/2025 | A47D 13/063 |
| EP | 4652899 | A1 | * | 11/2025 | A47D 13/063 |
| EP | 4717128 | A1 | * | 4/2026 | F16C 11/04 |

* cited by examiner

HIGH-STABILITY PLAYARD ENCLOSING ROD ASSEMBLY AND PLAYARD

CROSS REFERENCE TO THE RELATED APPLICATIONS

This application is based upon and claims priority to Chinese Patent Application No. 202422367471.8, filed on Sep. 27, 2024, the entire contents of which are incorporated herein by reference.

TECHNICAL FIELD

The present disclosure relates to the field of cribs, and in particular to a high-stability playard enclosing rod assembly and a playard.

BACKGROUND

A playard mainly includes a playard frame and an enclosure. The enclosure provides a safe space for a child to play, and can prevent the child from climbing out and falling. At present, Chinese patent application CN219479669U discloses a folding playard, including handrail assemblies. The handrail assemblies each include: a joint connector, upper enclosing rods, and lower enclosing rods. The joint connector is symmetrically provided with two first sliding grooves that are close to an upper portion of the joint connector and have a distance gradually increasing from top to bottom. There are two upper enclosing rods located at two sides of the joint connector. Rod bodies at ends of the two upper enclosing rods close to each other are respectively provided with first guide pins. The first guide pins are respectively embedded in the first sliding grooves and are respectively slidable along the first sliding grooves. There are two lower enclosing rods that are respectively arranged side by side with and below the two upper enclosing rods. Ends of the two lower enclosing rods close to each other are rotatably connected to the joint connector. When the folding playard is unfolded, the first guide pin is located at a top of the first sliding groove. When the folding playard is folded, the first guide pin slides to a bottom of the first sliding groove. Sides of the joint connector opposite to the two first sliding grooves are respectively provided with second sliding grooves. Rod bodies of the upper enclosing rods are respectively provided with second guide pins. The second guide pins are respectively slidably embedded in the second sliding grooves. When the handrail structure is unfolded, the second guide pin is located at an end of the second sliding groove close to the first sliding groove. When the handrail structure is folded, the second guide pin slides towards an end away from the first sliding groove.

In the above disclosure, the upper enclosing rod is directly connected to the joint connector through the first guide pin and the second guide pin. This leads to insufficient connection strength between the upper enclosing rod and the joint connector and a large gap between the upper enclosing rod and the interior of the joint connector. As a result, the upper enclosing rod is prone to shaking during use. Overall, the above disclosure has problems of the overall connection strength between the upper enclosing rod and the joint connector and the stability of the upper enclosing rod not being high.

SUMMARY

The present disclosure provides a high-stability playard enclosing rod assembly and playard. A main objective of the present disclosure is to overcome the problem that the existing playard enclosing rod assembly has insufficient overall connection strength between the upper enclosing rod and the joint connector and insufficient stability of the upper enclosing rod.

To solve the above technical problem, the present disclosure adopts the following technical solutions:

A high-stability playard enclosing rod assembly includes a hinge joint, two upper enclosing rods, two lower enclosing rods, a connecting base, and two first iron elements, where the connecting base is fixedly connected inside the hinge joint; the two first iron elements are respectively connected to front and rear portions of the connecting base; the first iron elements each are provided with two first guide grooves that are symmetrical on the left and right; the two first guide grooves are arranged in a splayed pattern; top left and right ends of the first iron element respectively extend away from the connecting base to form extension portions; left and right end surfaces of the first iron element respectively form inclined surfaces; the inclined surface is parallel to the first guide groove; an arc-shaped groove is formed between a bottom of the extension portion and a top of the inclined surface; ends of the two upper enclosing rods close to the hinge joint are respectively connected to second iron elements; a thickness of each of the second iron elements is adapted to a distance between the two first iron elements; the second iron elements are located between the two first iron elements; an end of the hinge joint away from the connecting base is provided with two second guide grooves that are symmetrical in a front-to-rear direction and arranged laterally; the arc-shaped groove is aligned with an end of the second guide groove close to the first iron element; the first iron element is provided with first guide pins and second guide pins; the first guide pin and the second guide pin respectively pass through the first guide groove and the second guide groove; when the upper enclosing rod is unfolded, the first guide pin is clamped in a top of the first guide groove, and the second guide pin is clamped in the arc-shaped groove; and ends of the two lower enclosing rods close to the hinge joint are hinged to the hinge joint.

Further, a top of each of the first guide grooves is provided with an arc-shaped clamping groove.

Further, the connecting base is triangular in shape; the connecting base is connected inside the hinge joint through three first connecting pins; the three first connecting pins are arranged in a three-point configuration; and the three first connecting pins pass through the first iron elements.

Further, the connecting base is provided with two mounting grooves that are arranged in the front-to-rear direction; tops of the two mounting grooves are open; and a middle of the first iron element is located inside the mounting groove.

Further, the ends of the upper enclosing rods close to the hinge joint are respectively connected to iron element connecting rods; and the second iron element is connected to the iron element connecting rod.

Furthermore, an end of the iron element connecting rod close to the first iron element is provided with a blocking portion and a clamping portion; the end of the upper enclosing rod close to the hinge joint is provided with a clamping groove; the iron element connecting rod is located inside the upper enclosing rod; the blocking portion is abutted against an end surface of the upper enclosing rod; the clamping portion is located inside the clamping groove; the iron element connecting rod is provided with an inserting groove; a half of the second iron element away from the first iron element is inserted into the inserting groove; the iron element connecting rod is connected to the upper enclosing rod through a second connecting pin; and the second connecting pin passes through the second iron element.

Furthermore, the half of the second iron element away from the first iron element has a height smaller than a height of a half of the second iron element close to the first iron element.

A playard adopts the above-mentioned playard enclosing rod assembly, and includes a folding base, four upper connectors, four vertical rods, four lower connectors, four connecting rods, and four playard enclosing rod assemblies, where the connecting rod is connected between the folding base and one lower connector; the vertical rod is connected between one upper connector and one lower connector; and the playard enclosing rod assembly is hinged between two adjacent upper connectors.

According to the description of the present disclosure, compared with the prior art, the present disclosure has the following advantages. The present disclosure has a novel structure and clever design. The thickness of the second iron element is adapted to the distance between the two first iron elements, and the second iron elements are located between the two first iron elements.

Due to this structural design, the second iron element is not prone to shaking, and the upper enclosing rod is stable when it is unfolded for use and folded. When the upper enclosing rod is unfolded for use, the first guide pin is clamped in the top of the first guide groove, and the second guide pin is clamped in the arc-shaped groove. In this way, the upper enclosing rod is connected to the two first iron elements and to the hinge joint, thereby improving the connection strength of the upper enclosing rods.

DETAILED DESCRIPTION OF THE EMBODIMENTS

Figure 1:
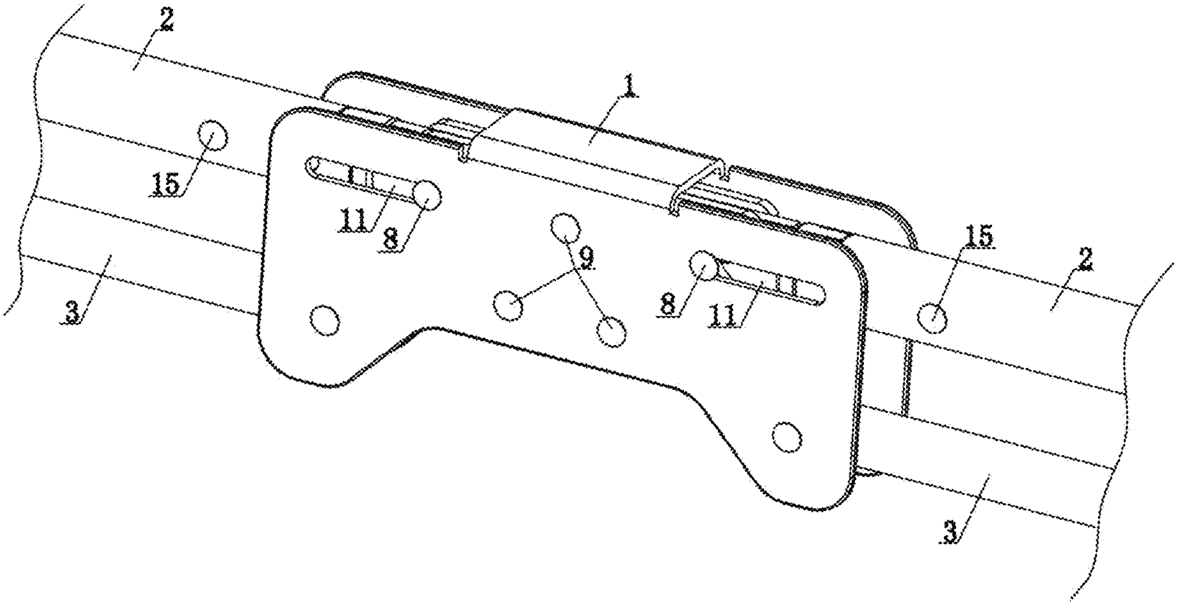
FIG. 1 is a structural diagram of a playard enclosing rod assembly according to the present disclosure.
Figure 2:
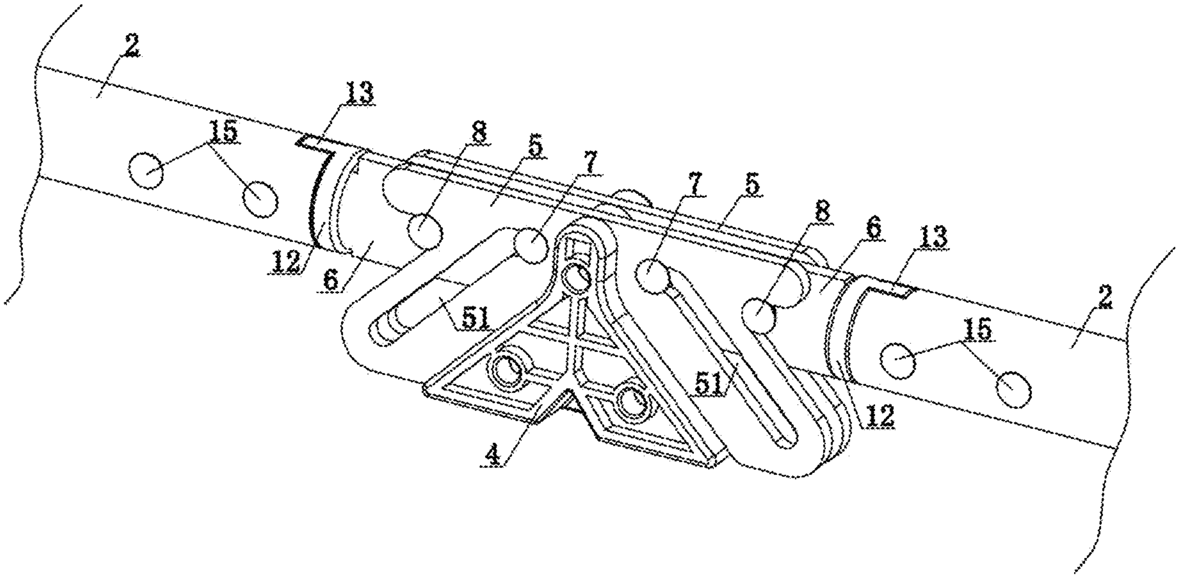
FIG. 2 is an internal structural diagram of a hinge joint according to the present disclosure.
Figure 3:
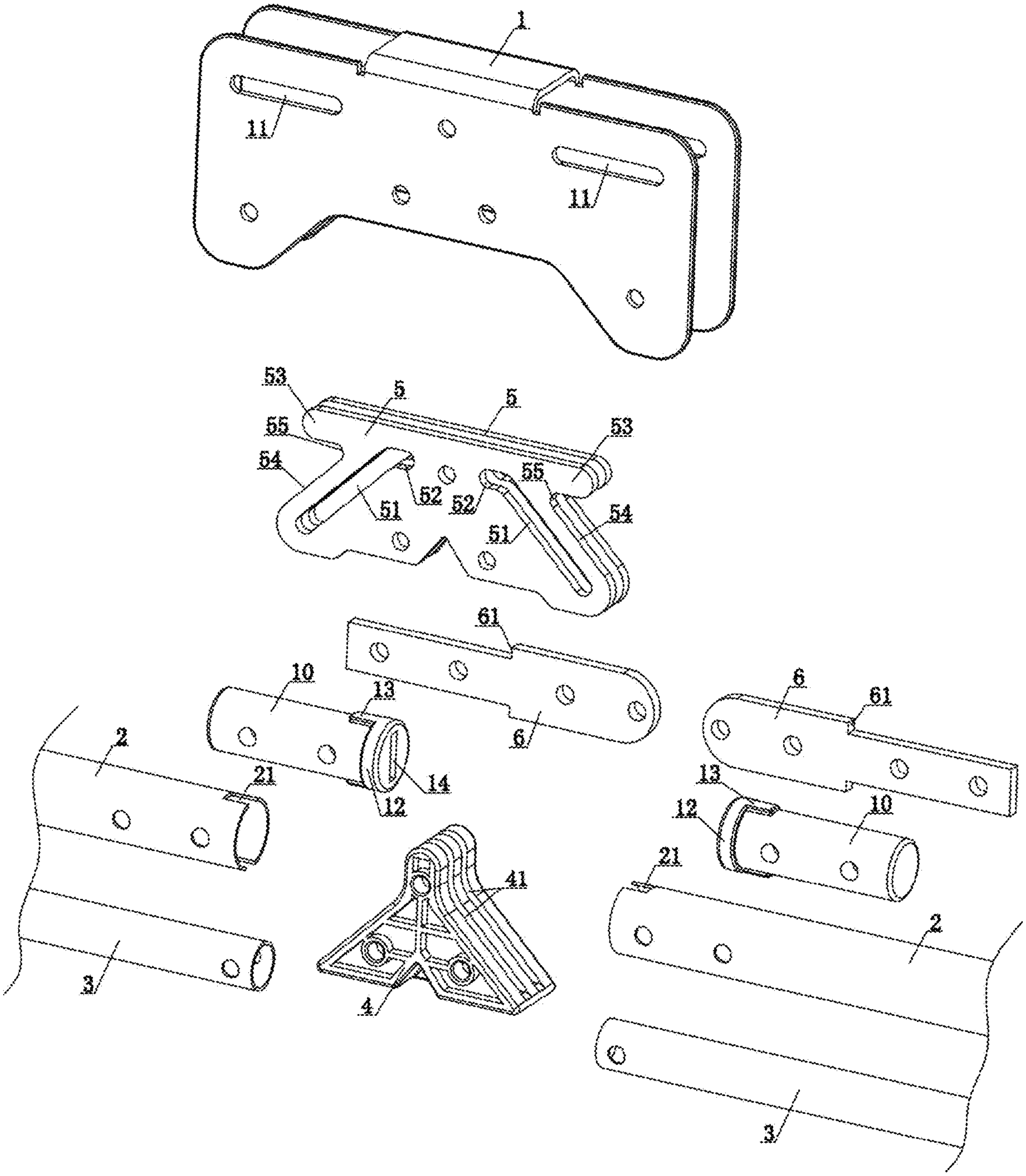
FIG. 3 is an exploded view of the playard enclosing rod assembly according to the present disclosure.

As shown in FIGS. 1 to 3, a high-stability playard enclosing rod assembly includes hinge joint 1, two upper enclosing rods 2, two lower enclosing rods 3, connecting base 4, and two first iron elements 5. The connecting base 4 is fixedly connected inside the hinge joint 1. The two first iron elements 5 are respectively connected to front and rear portions of the connecting base 4. The first iron elements 5 each are provided with two first guide grooves 51 that are symmetrical on the left and right of the two first iron elements. The two first guide grooves 51 are arranged in a splayed pattern. A top of each of the first guide grooves 51 is provided with an arc-shaped clamping groove 52. Top left and right ends of the first iron elements 5 respectively extend away from the connecting base 4 to form extension portions 53. Left and right end surfaces of the first iron elements 5 respectively form inclined surfaces 54. The inclined surfaces 54 are parallel to the first guide grooves 51. Arc-shaped groove 55 is formed between a bottom of each extension portion 53 and a top of each inclined surface 54. Ends of the two upper enclosing rods 2 close to the hinge joint 1 are respectively connected to second iron elements 6. A thickness of each of the second iron elements 6 is adapted to a distance between the two first iron elements 5. The second iron elements 6 are located between the two first iron elements 5. An end of the hinge joint 1 away from the connecting base 4 is provided with two second guide grooves 11 that are symmetrical in a front-to-rear direction of the hinge join and arranged laterally. Each arc-shaped groove 55 is aligned with an end of each second guide groove 11 close to the first iron elements 5. The first iron elements 5 are provided with first guide pins 7 and second guide pins 8. The first guide pins 7 and the second guide pins respectively pass through the first guide grooves 51 and the second guide grooves 11. When the upper enclosing rods 2 are unfolded, the first guide pins 7 are clamped in the arc-shaped clamping grooves 52 of the first guide grooves 51, and the second guide pins 8 are clamped in the arc-shaped grooves 55. Ends of the two lower enclosing rods 3 close to the hinge joint 1 are hinged to the hinge joint 1.

As shown in FIGS. 1 to 3, the thickness of the second iron elements 6 are adapted to the distance between the two first iron elements 5, and the second iron elements 6 are located between the two first iron elements 5. Due to this structural design, the second iron elements 6 are not prone to shaking, and the upper enclosing rod 2 is stable when it is unfolded for use and folded. When the upper enclosing rod 2 is unfolded for use, the first guide pin 7 is clamped in the arc-shaped clamping groove 52 of the first guide groove 51, and the second guide pin 8 is clamped in the arc-shaped groove 52. In this way, the upper enclosing rod 2 is connected to the two first iron elements 5 and to the hinge joint 1, thereby improving the connection strength of the upper enclosing rods 2. In addition, when the playard is wrapped with a fabric cover, the contact area between the second iron element 6 and the fabric cover is small, so when the playard is folded, the second iron element 6 is not likely to clamp the fabric cover.

As shown in FIGS. 1 to 3, the connecting base 4 is triangular in shape. The connecting base 4 is connected inside the hinge joint 1 through three first connecting pins 9. The three first connecting pins 9 are arranged in a three-point configuration. The three first connecting pins 9 pass through the first iron elements 5. The connecting base 4 is provided with two mounting grooves 41 that are arranged in the front-to-rear direction of the connecting base. The tops of the two mounting grooves 41 are open. A middle of the first iron elements 5 is located inside the mounting grooves 41.

As shown in FIGS. 1 to 3, the ends of the upper enclosing rods 2 close to the hinge joint 1 are respectively connected to iron element connecting rods 10. The second iron elements 6 are connected to the iron element connecting rods 10. Specifically, an end of each iron element connecting rod 10 close to each first iron element 5 is provided with a blocking portion 12 and a clamping portion 13. The end of each upper enclosing rod 2 close to the hinge joint 1 is provided with a clamping groove 21. The iron element connecting rods 10 are located inside the upper enclosing rods 2. The blocking portions 12 are abutted against end surfaces of the upper enclosing rods 2. The clamping portions 13 are located inside the clamping grooves 21. Each iron element connecting rod 10 is provided with an inserting groove 14. A half of each second iron element 6 away from the first iron elements 5 is inserted into the inserting grooves 14. The iron element connecting rods 10 are connected to the upper enclosing rods 2 through second connecting pins 15. The second connecting pins 15 passes through the second iron elements 6. The half of the second iron element 6 away from each first iron elements 5 has a height smaller than a height of a half of each second iron element 6 close to the first iron elements 5. Thus, the second iron elements 6 form stepped surfaces 61. When the half of each second iron elements 6 away from the first iron element 5 is inserted into the inserting grooves 14, the stepped surfaces 61 are abutted against the blocking portions 12.

Figure 4:
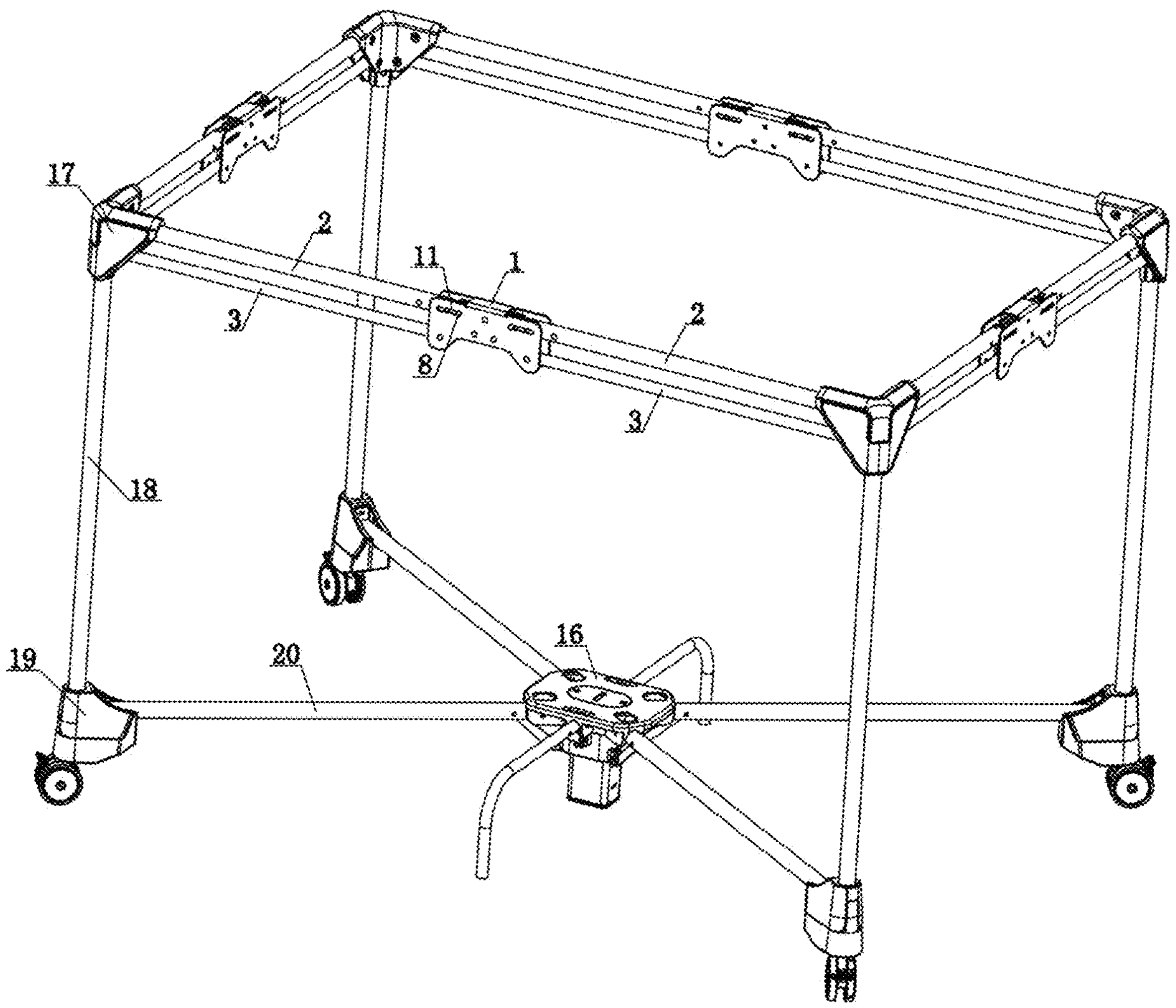
FIG. 4 is a structural diagram of a playard according to the present disclosure.

As shown in FIGS. 1 and 4, the present disclosure further provided a playard, which adopts the above-mentioned playard enclosing rod assembly and includes folding base 16, four upper connectors 17, four vertical rods 18, four lower connectors 19, four connecting rods 20, and four playard enclosing rod assemblies. The connecting rods 20 are connected between the folding base 16 and one lower connector 19. The vertical rods 18 are connected between one upper connector 17 and one lower connector 19. The playard enclosing rod assemblies are hinged between two adjacent upper connectors 17. The folding base 16 is an existing structure and will not be further described here. When the folding base is lifted upwards, it drives the four connecting rods 20 to fold upwards.

As shown in FIGS. 1 to 4, a design principle of the present disclosure is as follows. When the playard is unfolded for use, the first guide pins 7 are clamped in the arc-shaped clamping grooves 52 of the first guide grooves 51, and the second guide pins 8 is clamped in the arc-shaped grooves 52. When the playard needs to be folded, the folding base 16 is lifted upwards, so that the folding base 16 simultaneously drives the four connecting rods 20 to fold upwards, thereby pulling the four lower connectors 19 to fold towards the folding base 16. At this point, lower portions of the four vertical rods 18 are pulled inward by tension. Due to a constant length of the lower enclosing rod 3, when a lower portion of each vertical rod 18 is folded inward, an upper portion of each vertical rod 18 expands outward. The upper portion of each vertical rods 18 pulls the upper enclosing rod 2 to move outward through the upper connectors 17. When the upper enclosing rods 2 moves outward, they drives the first guide pins 7 to separate from the arc-shaped clamping grooves 52 and gradually move outward and downward along the first guide grooves 51, thereby causing the upper enclosing rods 2 to start folding. When the first guide pins 7 move outward and downward, the second guide pins 8 moves outward along the second guide grooves 11. Meanwhile, the hinge joint 1 gradually descends when the vertical rods 18 fold inward. As the hinge joint 1 gradually descends, the lower enclosing rods 3 and a hinge end of the hinge joint 1 rotate and fold relative to the hinge joint 1.

The above described are merely specific implementations of the present disclosure, but the design concept of the present disclosure is not limited thereto. Any non-substantial changes made to the present disclosure based on the concept of the present disclosure should fall within the protection scope of the present disclosure.

What is claimed is:

1. A high-stability playard enclosing rod assembly, comprising a hinge joint, two upper enclosing rods, two lower enclosing rods, a connecting base, and two first iron elements, wherein the connecting base is fixedly connected inside the hinge joint;

the two first iron elements are respectively connected to front and rear portions of the connecting base;

the two first iron elements each are provided with two first guide grooves, wherein the two first guide grooves are symmetrical on the left and right of the two first iron elements;

the two first guide grooves are arranged in a splayed pattern;

top left and right ends of the first iron elements respectively extend away from the connecting base to form extension portions;

left and right end surfaces of the first iron elements respectively form inclined surfaces; the inclined surfaces are parallel to the first guide grooves;

an arc-shaped groove is formed between a bottom of each extension portion and a top of each inclined surface;

ends of the two upper enclosing rods adjacent to the hinge joint are respectively connected to second iron elements;

a thickness of each of the second iron elements is adapted to a distance between the two first iron elements;

the second iron elements are located between the two first iron elements; an end of the hinge joint away from the connecting base is provided with two second guide grooves, wherein the two second guide grooves are symmetrical in a front-to-rear direction of the hinge joint and arranged laterally;

each arc-shaped groove is aligned with an end of each second guide groove adjacent to the first iron elements;

the first iron elements are provided with first guide pins and second guide pins;

the first guide pins and the second guide pins respectively pass through the first guide grooves and the second guide grooves;

when the upper enclosing rods are unfolded, the first guide pins are clamped in a top of the first guide grooves, and the second guide pins are clamped in the arc-shaped grooves; and ends of the two lower enclosing rods adjacent to the hinge joint are hinged to the hinge joint.

2. The high-stability playard enclosing rod assembly according to claim 1, wherein a top of each of the two first guide grooves is provided with an arc-shaped clamping groove.

3. The high-stability playard enclosing rod assembly according to claim 1, wherein the connecting base is triangular in shape; the connecting base is connected inside the hinge joint through three first connecting pins; the three first connecting pins are arranged in a three-point configuration; and the three first connecting pins pass through the two first iron elements.

4. The high-stability playard enclosing rod assembly according to claim 1, wherein the connecting base is provided with two mounting grooves, wherein the two mounting grooves are arranged in the front-to-rear direction of the connecting base; the tops of the two mounting grooves are open; and a middle of each first iron element is located inside the mounting grooves.

5. The high-stability playard enclosing rod assembly according to claim 1, wherein the ends of the upper enclosing rods adjacent to the hinge joint are respectively connected to iron element connecting rods; and the second iron elements are connected to the iron element connecting rod.

6. The high-stability playard enclosing rod assembly according to claim 5, wherein an end of each iron element connecting rod adjacent to each first iron element is provided with a blocking portion and a clamping portion; the end of the upper enclosing rod adjacent to each hinge joint is provided with a clamping groove; the iron element connecting rods are located inside the upper enclosing rods; the blocking portions are abutted against end surfaces of the upper enclosing rods; the clamping portions are located inside the clamping grooves; each iron element connecting rod is provided with an inserting groove; a half of each second iron element away from the first iron elements is inserted into the inserting grooves; the iron element connecting rods are connected to the upper enclosing rods through second connecting pins; and the second connecting pins pass through the second iron elements.

7. The high-stability playard enclosing rod assembly according to claim 6, wherein the half of each second iron elements away from the first iron element has a height smaller than a height of a half of each second iron elements adjacent to the first iron element.

8. A playard, adopting the high-stability playard enclosing rod assembly according to claim 1, and comprising a folding base, four upper connectors, four vertical rods, four lower connectors, four connecting rods, and four high-stability playard enclosing rod assemblies, wherein the connecting rods are connected between the folding base and one lower connector; the vertical rods are connected between one upper connector and one lower connector; and the high-stability playard enclosing rod assembly is hinged between two adjacent upper connectors.

9. The playard according to claim 8, wherein in each high-stability playard enclosing rod assembly, a top of each of the two first guide grooves is provided with an arc-shaped clamping groove.

10. The playard according to claim 8, wherein in the each high-stability playard enclosing rod assembly, the connecting base is triangular in shape; the connecting base is connected inside the hinge joint through three first connecting pins; the three first connecting pins are arranged in a three-point configuration; and the three first connecting pins pass through the two first iron elements.

11. The playard according to claim 8, wherein in each high-stability playard enclosing rod assembly, the connecting base is provided with two mounting grooves, wherein the two mounting grooves are arranged in the front-to-rear direction of the connecting base; the tops of the two mounting grooves are open; and a middle of each first iron element is located inside the mounting grooves.

12. The playard according to claim 8, wherein in each high-stability playard enclosing rod assembly, the ends of the upper enclosing rods adjacent to the hinge joint are respectively connected to iron element connecting rods; and the second iron elements are connected to the iron element connecting rods.

13. The playard according to claim 12, wherein in each high-stability playard enclosing rod assembly, an end of each iron element connecting rod adjacent to each first iron element is provided with a blocking portion and a clamping portion; the end of each upper enclosing rod adjacent to the hinge joint is provided with a clamping groove; the iron element connecting rods are located inside the upper enclosing rods; the blocking portions are abutted against end surfaces of the upper enclosing rods; the clamping portions are located inside the clamping grooves; each iron element connecting rod is provided with an inserting groove; a half of each second iron element away from the first iron elements is inserted into the inserting grooves; the iron element connecting rods are connected to the upper enclosing rods through second connecting pins; and the second connecting pins pass through the second iron elements.

14. The playard according to claim 13, wherein in each high-stability playard enclosing rod assembly, the half of the second iron element away from the first iron element has a height smaller than a height of a half of each second iron elements adjacent to each first iron elements.

* * * * *